United States Patent
Siegel et al.

(10) Patent No.: US 9,380,080 B2
(45) Date of Patent: Jun. 28, 2016

(54) SESSION INITIATION FOR MULTIMEDIA SERVICES

(71) Applicant: AT&T Intellectual Property I, L.P., Atlanta, GA (US)

(72) Inventors: Steven A. Siegel, Mendham, NJ (US); Leopold B. Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 216 days.

(21) Appl. No.: 13/671,699

(22) Filed: Nov. 8, 2012

(65) Prior Publication Data

US 2014/0128108 A1    May 8, 2014

(51) Int. Cl.
*H04M 3/42* (2006.01)
*H04L 29/06* (2006.01)
*H04M 3/56* (2006.01)

(52) U.S. Cl.
CPC .......... *H04L 65/1069* (2013.01); *H04L 65/104* (2013.01); *H04L 65/1006* (2013.01); *H04L 65/1016* (2013.01); *H04M 3/567* (2013.01); *H04M 2203/5063* (2013.01)

(58) Field of Classification Search
CPC ............ H04L 12/1813; H04L 12/1818; H04L 12/1822; H04L 12/1827; H04L 29/06027; H04L 65/403; H04M 2203/5063; H04M 3/56; H04M 3/567; G06Q 10/10; G06Q 10/109

USPC ............... 455/414.1, 416, 418, 419, 420; 370/260, 261, 262

See application file for complete search history.

(56) References Cited

U.S. PATENT DOCUMENTS

| | | | |
|---|---|---|---|
| 8,319,816 B1 * | 11/2012 | Swanson et al. | 348/14.01 |
| 8,887,070 B1 * | 11/2014 | Hecht et al. | 455/416 |
| 2005/0174987 A1 | 8/2005 | Raghav | |
| 2005/0210114 A1 * | 9/2005 | Washburn | 709/206 |
| 2006/0093119 A1 | 5/2006 | Wilson | |
| 2008/0155104 A1 | 6/2008 | Quinn | |
| 2009/0147705 A1 * | 6/2009 | Kowalewski | 370/261 |
| 2010/0046733 A1 * | 2/2010 | Shen et al. | 379/212.01 |
| 2010/0157013 A1 * | 6/2010 | Sylvain | 348/14.01 |
| 2011/0044184 A1 * | 2/2011 | Balasaygun et al. | 370/252 |
| 2012/0072340 A1 * | 3/2012 | Amron | 705/39 |
| 2012/0117156 A1 * | 5/2012 | Anka | 709/205 |

* cited by examiner

*Primary Examiner* — Thai Vu
(74) *Attorney, Agent, or Firm* — Toler Law Group, PC

(57) ABSTRACT

A method includes receiving, at a first communication service provider, a request (by a first device and including identification information associated with a particular user of a second device) to initiate a session between the first device and the second device for a multimedia service provided by a second communication service provider. The method includes determining access information associated with the second device based on the identification information and sending a call invitation to the second device to initiate the session. Accepting the call invitation causes the second device to receive the particular application (which is executable to facilitate initiation of the session) from the second communication service provider via a connection between the second device and the second communication service provider.

20 Claims, 5 Drawing Sheets

SESSION INITIATION FOR MULTIMEDIA SERVICES

FIELD OF THE DISCLOSURE

The present disclosure is generally related to session initiation for multimedia services.

BACKGROUND

Communication service providers (e.g., telephony service provider, application service provider, or internet service provider) may provide multimedia services and telecommunication services via communication networks. Standards for telecommunication services may specify how telecommunication services are provided between customers who receive telecommunication service from different telecommunication service providers. Regulation of standards between telecommunication providers enables telecommunication services to be provided between telecommunication providers without difficulties.

Unlike traditional telecommunications services, communication of multimedia services (e.g., business applications, email applications, and media applications) between communication service providers is relatively non-standardized. Each communication service provider may establish its own standards that define how multimedia data for multimedia services is encoded, sent, decoded, and displayed. Communication service providers may define standards for multimedia services based on considerations of multimedia service platforms, multimedia applications (e.g., proprietary software applications), and customized services. Two devices that receive communication service from different communication service providers may not be able to establish a communication session for multimedia service between the two devices due to differences in standards applied by each communication service provider. A particular communication service provider may provide a multimedia service to registered users via a particular application provided by the particular communication service provider. Two devices that are registered to receive communication service from different communication service providers via a particular application provided by the different communication service providers, respectively, may be unable to instantly initiate a communication session due to several procedures (e.g., registration and application installation) that may be performed before the session can be established.

DETAILED DESCRIPTION

Figure 1:
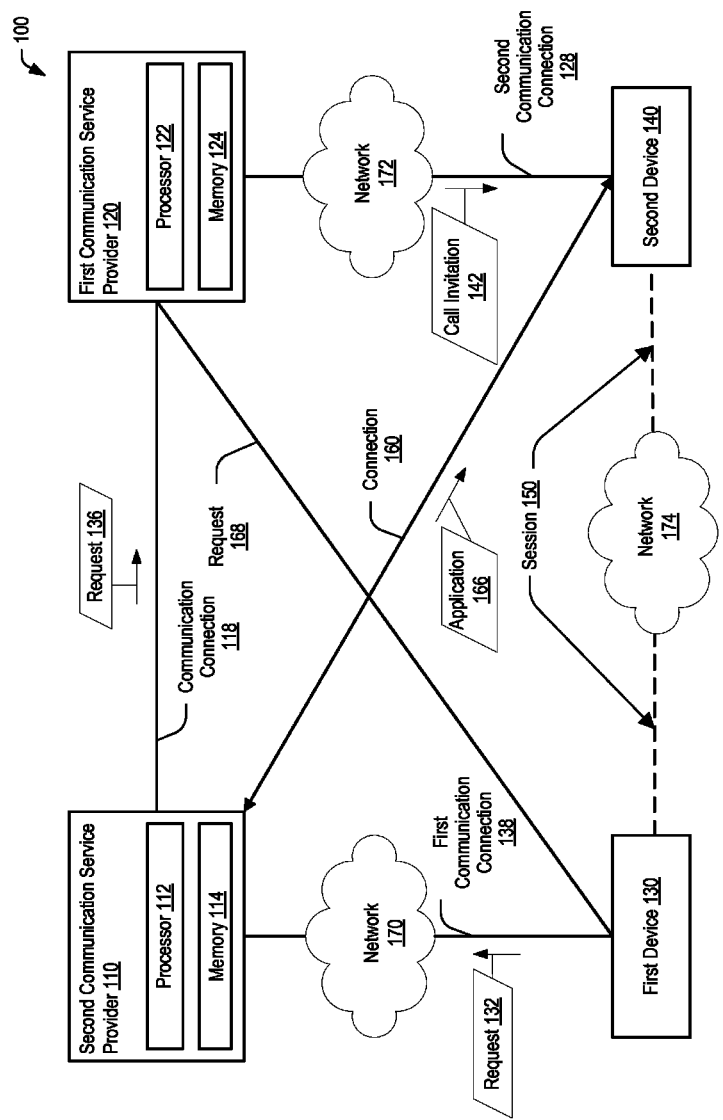
FIG. 1 is a diagram of a first embodiment of a system to initiate a session between two devices for a multimedia service.

Two devices may engage in a communication session for a multimedia service that is initiated via communication between two communication service providers, each of which provides a communication service to a distinct one of the two devices. The communication service may support communication for multimedia services (e.g., multimedia applications or web services) between two devices. Communication for multimedia services may involve exchanging multimedia data between two devices. One type of communication service provider may provide multimedia services, such as an application service, that involve an exchange of multimedia data. Another type of communication service provider may provide a communication access service, where a communication access service may include a telephony service, an internet service, a voice-over-internet protocol service, or an internet protocol television service. A multimedia service associated with the communication session may be provided by a first communication service provider of the two communication service providers. The first device may be registered to receive services (e.g., a multimedia service) from the first communication service provider. The second device may be registered to receive a communication service (e.g., the multimedia service) from a second communication service provider of the two service providers. Registration to receive a particular service (e.g., the multimedia service) provided by a communication service provider may be determined based on whether a device is in communication with the communication service provider to receive the particular service. To illustrate, in a particular embodiment, the device is registered to receive the particular service when the device is in communication with the communication service provider to receive the particular service, and the device is not registered to receive the particular service when the device is not in communication with the communication service provider to receive the particular service. In this embodiment, registration is distinct from, for example, subscription in that a user may have a user device that is subscribed to receive a service; however, when the user device is powered off or otherwise out of communication with the service provider, the user device is not registered to receive the service.

To initiate the communication session, the first device may send a request to the first communication service provider to initiate the communication session for a multimedia service with one or more devices (e.g., the second device) associated with a particular user. The multimedia service may be accessible via a particular application. The particular application may be provided by the first communication service provider. When the request is sent, the first device may have access to the particular application and the second device may not have access to the particular application. The request may include identification information that includes a communication identifier (e.g., a telephone number, an email address, an internet protocol multimedia subsystem (IMS) public user identity, or a uniform resource identifier) associated with the particular user. The first communication service provider may identify a second communication service provider based on the identification information in the request received from the first device. The second communication service provider may be identified based on the identification information. The second communication service provider may have access information that enables the second communication service provider to communicate with the one or more devices (e.g., the second device) associated with the particular user. The second communication service provider may select the second device from the plurality of devices associated with the particular user based on the access information. Based on identifying the second communication service provider from the identification information, the first communication service provider sends a request that includes the identification information to the second communication service provider, where the request is to initiate a communication session between the first device and the second device for the multimedia service.

In response to receipt of the request from the first communication service provider, the second communication service provider may determine access information associated with the second device based on the identification information. The second communication service provider may send a call invitation to the second device inviting the second device to initiate a communication session with the first device. Accepting the call invitation may cause a connection to be created between the first communication service provider and the second device. Accepting the call invitation may cause the second device to receive a particular application from the first communication service provider via the connection created between the second device and the first communication service provider. The particular application may be executable to facilitate initiation of the communication session with the first device. The communication session may be initiated by the first device via the particular application, by the second device via the particular application, or both. The session may be initiated from the particular application at the second device via the connection created with the first communication service provider. The first communication service provider may support web real-time-communications enabling the first device and the second device to communicate via web real-time-communications. Such communication sessions many support exchange of multimedia data associated with many types of multimedia services through a web real-time-communications application (e.g., a web real-time-communications browser). The web real-time-communications application may be executing particular program code that supports one or more multimedia services.

Thus, a session may be initiated to facilitate communications between two devices for a multimedia service, which may not otherwise be possible due to limitations of the devices themselves or communication services available to each of the two devices. The communications between the two devices that is facilitated by the two distinct communication service providers may enable the session to be initiated synchronously via a call invitation by one of the two devices. The call invitation may enable a device (e.g., the second device) to join a session with another device (e.g., the first device) to receive a multimedia service corresponding to the session when the device was not previously registered with a particular communication service provider that provides the multimedia service.

In a particular embodiment, a method includes receiving, at a first communication service provider, a request to initiate a session between a first device and a second device associated with a particular user for a multimedia service provided by a second communication service provider. The request may be initiated by the first device and may be received from the second communication service provider. The request includes identification information associated with the particular user. The second device may not be registered with the multimedia service and may be registered with a communication service provided by the first communication service provider. The first device may be registered with the multimedia service and may not be registered with the communication service. The first device may have access to a particular application to access the multimedia service from the second communication service provider. The method further includes determining access information associated with the second device based on the identification information. The method further includes sending a call invitation to the second device to initiate the session with the first device, where the call invitation is sent based on the access information. Accepting the call invitation may cause the second device to receive the particular application from the second communication service provider via a connection created between the second device and the second communication service provider. The particular application may be executable to facilitate initiation of the session.

In another particular embodiment, a system includes a processor and a memory accessible to the processor. The memory includes instructions that, when executed by the processor, cause the processor to perform a method that includes receiving, at a first communication service provider, a request to initiate a session between a first device and a second device associated with a particular user for a multimedia service provided by a second communication service provider. The request may be initiated by the first device and may be received from the second communication service provider. The request includes identification information associated with the particular user of the second device. The second device may not be registered with the multimedia service and may be registered with a communication service provided by the first communication service provider. The first device may be registered with the multimedia service and may not be registered with the communication service. The first device may have access to a particular application to access the multimedia service from the second communication service provider. The method further includes determining access information associated with the second device based on the identification information. The method further includes sending a call invitation to the second device to initiate the session with the first device, where the call invitation is sent based on the access information. Accepting the call invitation may cause the second device to receive the particular application from the second communication service provider via a connection created between the second device and the second communication service provider. The particular application may be executable to facilitate initiation of the session.

In another particular embodiment, a computer-readable device includes operational instructions that, when executed by a processor, cause the processor to perform a method including receiving, at a first communication service provider, a request to initiate a session between a first device and a second device associated with a particular user for an multimedia service provided by a second communication service provider. The request may be initiated by the first device and may be received from the second communication service provider. The request includes identification information associated with the particular user of the second device. The second device may not be registered with the multimedia service and may be registered with a communication service provided by the first communication service provider. The first device may be registered with the multimedia service and may not be registered with the communication service. The first device may have access to a particular application to access the multimedia service from the second communication service provider. The method further includes determining access information associated with the second device based on the identification information. The method further includes sending a call invitation to the second device to initiate the session with the first device, where the call invitation is sent based on the access information. Accepting the call invitation may cause the second device to receive the particular application from the second communication service provider via a connection created between the second device and the second communication service provider. The particular application may be executable to facilitate initiation of the session.

Referring to FIG. 1, a diagram of a first embodiment of a system 100 to initiate a session between two devices for a multimedia service is shown.

The system 100 includes a first communication service provider 120 that may provide one or more communication services to one or more second devices, such as a representative second device 140, which may be communicatively connected to the first communication service provider 120. In one example, the second device 140 may receive a particular communication service provided by the first communication service provider 120 based on registration associated with the second device 140. In another example, a user associated with the second device 140 may be registered with a particular communication service provided by the first communication service provider 120. Registration to a particular service (e.g., the particular communication service) provided by a communication service provider may be determined based on whether a device is in communication with the communication service provider to receive the particular service. A device may be registered when the device is in communication with the communication service provider to receive the particular service. The one or more communication services may include, but may not be limited to, communication access services such as telephony services, internet services, media services, voice-over-internet protocol services, internet protocol television services, or a combination thereof.

In a particular embodiment, the second device 140 may be communicatively connected to the first communication service provider 120 via a network 172. The network 172 may include one or more networks that facilitate communication between the first communication service provider 120 and the second device 140. The network 172 may be associated with one or more service providers that facilitate communication for a particular application service (e.g., a multimedia service). Alternately, or in addition, the network 172 may be associated with a network access service provider, such as a mobile communication network provider, an internet or intranet access service provider, or a combination thereof.

The system 100 includes a second communication service provider 110 that may provide one or more communication services to one or more first devices, such as a representative first device 130, which may be communicatively connected to the second communication service provider 110. In one example, the first device 130 may receive a particular multimedia service provided by the second communication service provider 110 based on registration of the first device 130 with the second communication service provider 110. Access to the particular multimedia service may be obtained by a particular application present in a device that receives the particular multimedia service. As such, the first device 130 may have access to the particular application to access the particular multimedia service. The one or more multimedia services provided by the second communication service provider 110 may involve services that communicate multimedia data, such as application services including but not limited to, communication applications (e.g., voice-over-internet protocol applications), business applications (e.g., human resource applications), email applications (e.g., internet-based email applications), media applications (e.g., on-demand video applications, game applications, or music applications), or storage applications (e.g., cloud storage applications).

In a particular embodiment, the first device 130 may be communicatively connected to the second communication service provider 110 via a network 170. The network 170 may include one or more networks that facilitate communication between the second communication service provider 110 and the first device 130. The network 170 may be associated with one or more application service providers that facilitate communication for a particular application service (e.g., a multimedia service). Alternately, or in addition, the network 170 may be associated with a network access service provider, such as a mobile communication network provider, an internet or intranet access service provider, or a combination thereof.

In a particular embodiment, the second device 140 is not registered with the second communication service provider 110 and the first device 130 is not registered with the first communication service provider 120. Thus, the first device 130 may encounter difficulty in establishing a session with the second device 140 via the second communication service provider 110. An embodiment disclosed herein enables one or more sessions, such as a representative session 150, to be initiated between the first device 130 and the second device 140. The session 150 may enable the first device 130 and the second device 140 to engage in user-to-user communications, which may include communication that involves exchange of voice data, video data, multimedia data, other data (e.g., images, games, or applications), computer instructions, forms, or a combination of thereof. The user-to-user communications may be presented in a particular manner based in a type of application. The session 150 may be associated with one or more multimedia services provided by the second communication service provider 110. For example, the session 150 may be web meeting session for a web meeting application service in which an exchange of multimedia data may occur. In another example, the session 150 may be a gaming session for a game application service.

In a particular embodiment, communication via the session 150 between the first device 130 and the second device 140 may be facilitated via a network 174. The network 174 may include one or more networks that facilitate communication between the second device 140 and the first device 130. The network 174 may be associated with one or more application service providers that facilitate communication for a particular application service (e.g., a multimedia service). Alternately, or in addition, the network 174 may be associated with a network access service provider, such as a mobile communication network provider, an internet or intranet access service provider, or a combination thereof. In a particular embodiment, the networks 170, 172 and 174 are distinct. For example, each of the networks 170, 172 and 174 may be associated with a different service provider. In another embodiment, the networks 170, 172 and 174 are associated with a single service provider, e.g., the networks 170, 172 and 174 are portions of a single network. In yet another embodiment, two of the networks 170, 172 and 174 are the same and one of the networks 170, 172 and 174 is distinct. For example, the networks 170 and 172 may be associated with a single service provider, e.g., the networks 170 and 172 are portions of a single network, and the network 174 is a distinct network. Additionally, although the session 150 is illustrated in FIG. 1 as facilitated via the network 174, in a particular embodiment, the session 150 may be routed through or facilitated by the first communication service provider 120, the second communication service provider 110, the network 172, the network 170, or a combination thereof.

In a particular embodiment, the second communication service provider 110 may receive, from the first device 130 a request, such as a request 132, to initiate the session 150 with the second device 140 for a particular multimedia service provided by the second communication service provider 110.

The second device 140 identified in the request 132 may be registered with the first communication service provider 120 or one or more communication services provided by the first communication service provider 120. The second device 140 may not be communicatively connected to or registered with the second communication service provider 110 when the request 132 is sent.

The second communication service provider 110 may communicate to the first communication service provider 120 a request, such as a request 136, to initiate the session 150 based on the request 132 received from the first device 130. The first communication service provider 120 may send a call invitation, such as a call invitation 142, to the second device 140 based on the request 136. The call invitation 142 may invite the second device 140 to initiate the session 150 with the first device 130. The call invitation 142, when accepted, may enable the second device 140 to initiate the session 150 for a particular multimedia service associated with a request (e.g., the request 136). To illustrate, the call invitation 142, when accepted, may cause a connection 160 to be created between the second device 140 and the second communication service provider 110. Accepting the call invitation 142 may enable the second device 140 to receive (e.g., download) a particular application 166 from the second communication service provider 110 via the connection 160. The particular application 166 may facilitate initiation of the session 150 at the second device 140. The session 150 may be automatically initiated after receipt of the particular application 166 when the connection 160 is created with the second communication service provider 110. The session 150 may be initiated via the connection 160, the network 174, or a combination thereof. In a particular embodiment, the session 150 may be initiated via the connection 160, the network 174, or a combination thereof, by the first device 130. The first device 130 may receive information from the second communication service provider 110 that may serve as an indication that the session 150 may be established. For example, the second communication service provider 110 may provide information to the first device 130 indicating that the second device 140 has access to the application 166, the connection 160 has been established, the call invitation 142 has been accepted, or a combination thereof. Thus, a session can be initiated between two devices for a multimedia service provided by a communication service provider, where one of the two devices may not be registered with the communication service provider (providing the multimedia service) prior to initiation of the session.

In FIG. 1, the second communication service provider 110 may include one or more computing devices. The one or more computing devices include a personal computer, a terminal, a server, a laptop computer, a mobile device, another computing device, or a combination thereof. The mobile device may be, but is not limited to, a smart phone, a personal digital assistant, a tablet computing device, and/or a mobile personal computer. The second communication service provider 110 may include at least one processor 112 and at least one memory 114. The at least one memory 114 may be accessible to the at least one processor 112. The memory 114 may include instructions that are executable by the processor 112 to cause the processor 112 to perform one or more methods described herein at the second communication service provider 110.

The second communication service provider 110 may be communicatively connected to the first device 130 via one or more first communication connections such as a representative first communication connection 138. The second communication service provider 110 may be communicatively connected to the first communication service provider 120 via a communication connection 118. The second communication service provider 110 may be distinct from the first communication service provider 120. Alternatively, the second communication service provider 110 and the first communication service provider 120 may be associated with a particular communication service provider, or a single entity, that provides one or more distinct communication services.

The first communication service provider 120 may include one or more computing devices. The one or more computing devices may include a personal computer, a terminal, a server, a gateway, a laptop computer, a mobile device, another computing device, or a combination thereof. The mobile device may be, but is not limited to, a smart phone, a personal digital assistant, a tablet computing device, and/or a mobile personal computer. The first communication service provider 120 may include at least one processor 122 and at least one memory 124 accessible to the at least one processor 122. The memory 124 may include instructions that are executable by the processor 122 to cause the processor 122 to perform one or more methods described here at the first communication service provider 120. The first communication service provider 120 may include or be coupled to one or more storage devices. The memory 124, the one or more storage devices, or both may store information for the first communication service provider 120. For example, the stored information may include registration information, user identification information (e.g., an account number, a user name, or both), a communication identifier (e.g., an email address, a telephone number, or both), device registration information (e.g., a communication service provider account number), registration preference information, device registration information (e.g., an communication service provider account number), one or more addresses associated with one or more second devices (e.g., one or more communication addresses including an internet address, a device address, or both), or a combination thereof.

The first communication service provider 120 may be communicatively connected to one or more second devices (e.g., the second communication device 140) via one or more second communication connections such as a representative second communication connection 128. In a particular embodiment, the first communication service provider 120 may be configured to communicate with the second device 140 via a session initiation protocol (SIP).

The first device 130 and the second device 140 may be one of a computing device, a telephone, a media device, a mobile phone, another device with communication capabilities, or a combination thereof. The computing device may be, but is not limited to, a personal computer, a terminal, a server, tablet computing device, a laptop computer, a mobile device, or a combination thereof. The mobile device may be, but is not limited to, a smart phone, a personal digital assistant, and/or a mobile personal computer. The media device may be, but is not limited to, a personal digital assistant and/or a set-top box (STB).

The first communication connection 138, the communication connection 118, the second communication connection 128, and the connection 160 may each include a wired connection, a wireless connection, other data connection, or a combination thereof. The first communication connection 138, the communication connection 118, the second communication connection 128, the connection 160, or a combination thereof, may be used to communicate according to one or more of wireless mobile communication compliant standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x, or a combination thereof.

In operation, the second communication service provider 110 may receive the request 132 from the first device 130 to initiate a session (e.g., the session 150) between the first device 130 and the second device 140 for a particular multimedia service provided by the second communication service provider 110. The particular multimedia service associated with the session 150 to be initiated for the request 132 may be accessed via a particular application. In a particular embodiment, the request 132 may be sent by the particular application executing on the first device 130 that provides access to the particular multimedia service. The request 132 may be received from the first device 130 via the network 170, which may facilitate communication between the first device 130 and the second communication service provider 110.

The second communication service provider 110 may process the request 132. For example, the second communication service provider 110 may determine whether the first device 130 (or a user associated with the first device 130) is registered with the second communication service provider 110. As described above, the second device 140 may not be registered with the particular multimedia service. Further, the second device 140 may not be communicatively connected to the second communication service provider 110 prior to initiation of the session 150. In another example, the second communication service provider 110 may determine whether the first device 130 is configured to access or is associated with the particular multimedia service, such as by determining whether the first device 130 has access to an application (e.g., a web real-time-communications browser). The first device 130 may have access to the application when the application is present in the first device 130. The first device 130 may have access to the application when the first device 130 is registered with the second communication service provider 110.

The request 132 may include information associated with the first device 130. For example, the request 132 may include identification information associated with a user of the first device 130, such as a phone number, an email address, other contact information associated with the user of the first device 130, or other information (e.g., device port information or session allocation information) identifying the first device 130, other information identifying the user of the first device 130, or a combination thereof.

The request 132 may include multimedia service information associated with the particular multimedia service for the session 150 to be initiated. For example, the multimedia service information may include a name of the particular multimedia service associated with the request 132, a type of the particular multimedia service, other information related to the particular multimedia service, a topic of the particular multimedia service, or a combination thereof. The request 132 may include one or more criteria that indicate functionality that should be available to a device that can access the particular multimedia service. For example, the one or more criteria may include specification of a type of media supported by a device, a particular type of application, or both.

The request 132 may include identification information associated with a user of the second device 140, associated with the second device 140, or both. For example, the identification information may include a communication identifier (e.g., a telephone number, an email address, other contact information, or a combination thereof) associated with the user of the second device 140, other information (e.g., device port information or session allocation information) identifying the second device 140, other information identifying the user, or a combination thereof. To illustrate, the identification information may include a telephone number associated with a communication access service provided by the first communication service provider 120. In another example, the identification information may include a uniform resource identifier (URI). The URI may include, or may be included within, an email address associated with a user of the second device 140.

In response to receiving the request 132, the second communication service provider 110 may send a request 136 to the first communication service provider 120 to initiate the session 150 between the first device 130 and the second device 140. The request 136 may be based on or may correspond to the request 132 that is received from the first device 130. The request 136 may include the identification information of the request 132, the URI of the request 132, or a combination thereof. The second communication service provider 110 may provide a uniform resource locator (URL) address in the request 136. The URL may include a location where a connection, such as the connection 160, may be established at the second communication service provider 110.

The request 136 may include information associated with the first device 130. For example, the request 132 may include identification information associated with a user of the first device 130, such as a phone number, an email address, other contact information associated with the user of the first device 130, or other information (e.g., device port information or session allocation information) identifying the first device 130, other information identifying the user of the first device 130, or a combination thereof.

The request 136 may include multimedia service information associated with the particular multimedia service associated with the request 132. For example, the multimedia service information may include a name of the particular multimedia service associated with the request 132, a type of the particular multimedia service, other information related to the particular multimedia service, a topic of the particular multimedia service, or a combination thereof.

In a particular embodiment, the second communication service provider 110 may determine based on the identification information provided in the request 132 whether to send the request 136 to the first communication service provider 120. For example, the second communication service provider 110 may determine that contact information (e.g., an email address) in the identification information is associated with a particular communication service provider, such as the first communication service provider 120. The second communication service provider 110 may perform a domain name lookup based on the contact information to identify the particular communication service provider. Based on determining that the particular communication service provider is the first communication service provider 120, the second communication service provider 110 may send the request 136 to the first communication service provider 120.

In a particular embodiment, instead of sending the request 132 to the second communication service provider 110, the first device 130 may send a request 168 directly to the first communication service provider 120 to initiate the session (e.g., the session 150) between the first device 130 and the second device 140. The first device 130 may be configured to access or is associated with the particular multimedia service indicated by the request 168. For example, the first device 130 may include an application (e.g., a web real-time-communications browser) that provides access to the particular multimedia service provided by the second communication service provider 110. The first device 130 may determine how to send a request directly to the first communication service provider 120 based on the identification information being provided in the request 168. For example, the application executing on the first device 130 may determine that contact information included in the request 168 is associated with the first communication service provider 120. For example, the application may access domain name information based on the contact information to identify the first communication service provider 120. The request 168 may include the information that may be included in the request 136. Such information may be determined via the application executing in the first device 130, which may receive the information from the second communication service provider 110.

The first communication service provider 120 may receive the request 136 from the second communication service provider 110 or the request 168 from the first device 130. In a particular embodiment, the first communication service provider 120 may send one or more call invitations, such as the call invitation 142, to the second device 140 based on a received request (e.g., the request 136 or the request 168). The call invitation 142 may be sent to one or more second devices (e.g., the second device 140) associated with a user identified based on the identification information in the received request. The call invitation 142 may be sent to the one or more second devices (e.g., the second device 140) to invite one of the one of more second devices to participate in or initiate a session 150 with the first device 130. The first communication service provider 120 may send the call invitation 142 via a communication service provided to the second device 140. For example, the call invitation 142 may be sent as a telephone call via a telephony service provided to second device 140 by the first communication service provider 120. In another example, the first communication service provider 120 may send the call invitation 142 to the second device 140 via a SIP request.

The first communication service provider 120 may determine access information associated with one or more second devices (e.g., the second device 140) based on the identification information included in the received request. The access information may provide information identifying the second device 140, one or more users associated with the second device 140, or both. For example, the access information may include one or more addresses associated with the second device 140 (e.g., one or more communication addresses including an internet address, a device address, or both), user identification information (e.g., an email address, a telephone number, an account number, or a combination thereof), device registration information (e.g., an communication service provider account number), or a combination thereof. The access information may indicate or be associated with one or more preferences for communication with the second device 140. The one or more preferences may indicate one or more methods of communication, one or more methods of receiving call invitations, one or more multimedia services that may be requested for initiation of a session, or a combination thereof. For example, the one or more preferences may indicate how an invitation to establish a communication session with another communication device may be handled when the call invitation 142 is not accepted. In another example, the one or more preferences may include call forwarding information that identifies other communication devices that may receive a forwarded call including the call invitation 142 when the call invitation 142 is not accepted by the second device 140. The one or more preferences may include information indicating announcements (e.g., a voice announcement or a recorded message) to be played to the caller associated with the call invitation 142 when a user of the second device 140 does not accept the call invitation 142. The one or more preferences may indicate a voice message mailbox where the caller associated with the call invitation 142 can leave a voice message. The first communication service provider 120 may communicate with the second device 140 via a communication service based on the access information. The first communication service provider 120 may determine the access information by searching contents of the memory 124, the one or more other storage devices (e.g., a registration database) associated with the first communication service provider 120, or both.

In a particular embodiment, the first communication service provider 120 may determine, based on the access information, whether the second device 140 is registered with the first communication service provider 120 to receive a communication service. The first communication service provider 120 may identify registration information that is associated with the identification information. The registration information may correspond to a user of the second device 140. The registration information may identify access information (e.g., a communication address; e.g., an email address or a device address) corresponding to a plurality of devices that includes the second device 140.

In a particular embodiment, the first communication service provider 120 may select the one or more second devices, such as the second device 140, from the plurality of devices identified in the access information. For example, the first communication service provider 120 may select at least one of the plurality of devices, including the second device 140, associated with the user. To illustrate, the first communication service provider 120 may select one or more devices including the second device 140 from the plurality of devices based on determining a type of communication protocol supported by the plurality of devices. In another example, the first communication service provider 120 may select the second device 140 based on determining that the second device 140 supports communication using SIP corresponding to a communication service that provides a communication service using SIP. In another example, the first communication service provider 120 may select the second device 140 from the plurality of devices associated with the user based on determining that the second device supports a type of communication protocol that is capable of providing a particular communication service.

In a particular embodiment, the first communication service provider 120 may select the second device 140 from the plurality of devices based on determining whether the second device 140 includes an application configured to access a particular multimedia service. The access information associated with the second device 140 may include information indicating one or more applications supported by the second device 140. For example, the second device 140 may be selected from the plurality of devices based on determining that the second device 140 includes a web real-time-communications browser application that is configured to access a particular multimedia service.

In a particular embodiment, the first communication service provider 120 may select one or more second devices (e.g., the second device 140) from the plurality of devices associated with a communication identifier (e.g., a telephone number) included in the identification information. For example, the first communication service provider 120 may identify the second device 140 in the access information as being associated with the communication identifier for a particular access service provided to the second device 140.

The first communication service provider 120 may send the call invitation 142 to one or more second devices (e.g., the second device 140) via the second communication connection 128 to initiate the session 150 with the first device 130. The call invitation 142 may be based on the request 136 (or the request 168) sent to the first communication service provider 120, the access information, or both. By accepting the call invitation 142 may cause a connection (e.g., a web real-time-communications connection) to be created between the second device 140 and the second communication service provider 110. Accepting the call invitation 142 may cause the second device 140 to receive the particular application 166 from the second communication service provider 110 via the connection 160. The particular application 166 may be executable to facilitate initiation of the session 150 with the first device 130. The session 150 may be initiated by the first device 120 via the particular application 166, by the second device 140 via the particular application 166, or both. Initiation of the session 150 may be facilitated by the network 174. The session 150 may be automatically initiated when the particular application 166 is received. The particular application 166 may provide the multimedia service to the second device 140. The first device 130 may communicate with the second device 140 when the session 150 has been initiated for the multimedia service. The connection 160 may facilitate communication between the second device 140 and the first device 130 via the session 150 for the multimedia service.

In a particular embodiment, the one or more second devices (e.g., the second device 140) may be configured receive the call invitation 142 as an incoming telephone call. The call invitation 142 may identify a calling party associated with the first device 130, a multimedia service associated with the request 136 (or the request 168), a category of the multimedia service associated with the request 136 (or the request 168), a topic of the session to be initiated for the request 132, a user of the second device 140, or a combination thereof. The call invitation 142 may include a location at the second communication service provider 110 where a connection (e.g., the connection 160) may be established. The location may correspond to the URL included in the request 136 (or the request 168) received by the first communication service provider 120.

The call invitation 142 may be accepted by one of the one or more second devices. Accepting the call invitation may cause the connection 160 to be created between the second device 140 that accepted the call and the second communication service provider 110. Accepting the call invitation 142 may cause the second device 140 to receive the particular application 166 from the second communication service provider 110 via the connection 160. The particular application 166 may be executable to facilitate initiation of the session 150 with the first device 130. The session 150 may be initiated by the particular application 166 that the second device 140 receives from the second communication service provider 110 via the connection 160 created between the second device 140 and the second communication service provider 110. In a particular embodiment, the second device 140 may establish the connection 160 based on the location (e.g., the URL) of the second communication service provider 110 indicated in the call invitation 142.

In a particular embodiment, the second device 140 may have access to an application (e.g., a web real-time-communications browser) that is executable to facilitate initiation of the session 150 for the multimedia service via the connection 160. In this embodiment, the application may be executable to facilitate initiation of the session 150. The application, such as a web real-time-communications browser, may enable real-time communications to occur between the devices 130, 140 via a session (e.g., the session 150) after a connection (e.g., the connection 160) has been established through a communication service provider (e.g., the second communication service provider 110).

The first communication service provider 120 may receive one or more communications, via the second communication connection 128, from the second device 140 indicating a status associated with the call invitation 142. In a particular embodiment, the first communication service provider 120 may receive a notification that the second device 140 has accepted the call invitation 142. The first communication service provider 120 may receive other notifications such as information indicating that the second device 140 has downloaded the particular application 166 to access the multimedia service associated with the session 150, information indicating that the session 150 has been initiated, or both. The first communication service provider 120 may also receive a notification indicating that the call invitation 142 has not accepted.

Based on whether the notification regarding the call invitation 142 is received, the first communication service provider 120 may determine whether to send additional call invitations to invite the second device 140 to initiate additional sessions between the second device 140 and the first device 130. In a particular embodiment, the session 150 and the connection 160 may remain active after the second communication connection 128, the communication connection 118, or both have been terminated. In a particular embodiment, the first communication service provider 120 may send a notification to the second communication service provider 110, where the notification includes information indicating a status of the call invitation 142 sent based on the request 136 (or the request 168). The notification may include information received from the second device 140 with respect to the call invitation 142.

In response to receiving a notification from the second communication service provider 110 regarding a status of the call invitation 142, the first communication service provider 120 may send a notification to the first device 130. The notification may include the information received in the notification from the first communication service provider 120. The first device 130 may initiate the session 150 with the second device 140 in response to receiving the notification.

Thus, the system 100 may enable a first device registered with a particular communication service provider to invite a second device that is not registered with the particular communication service provider to join a session with the first device for a particular multimedia service. The system 100 enables the first device and the second device to communicate via a session that is initiated through communication facilitated by communication service providers while maintaining anonymity of the second device's access information associated with a communication service provider with which the second device is associated (e.g., registered). Further, the communication service provider that provides a communication service to the second device may enable the second device to join a communication session with the first device, via a call invitation, without performing several steps (e.g., registration and installation of software).

Figure 2:
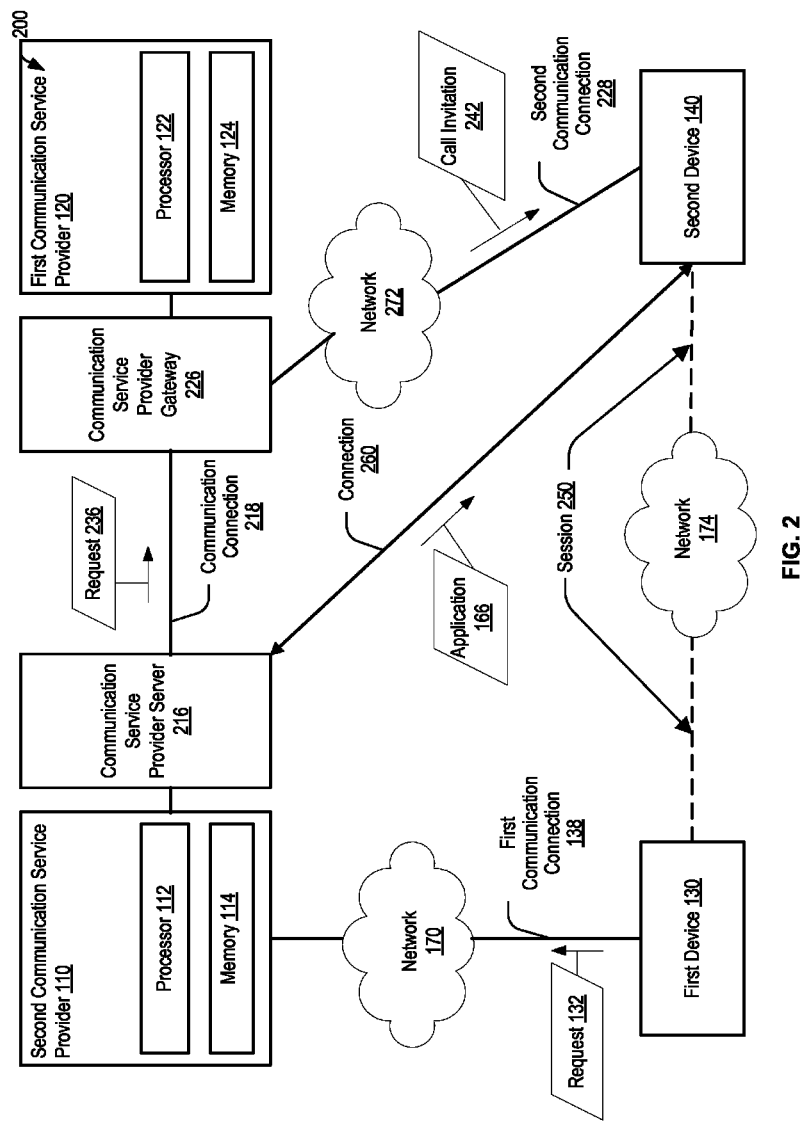
FIG. 2 is a diagram of a second embodiment of a system to initiate a session between two devices for a multimedia service.

FIG. 2 illustrates a diagram of a second embodiment of a system 200 to initiate a session between two devices for a multimedia service. The system 200 includes certain elements of the system 100 described with respect to FIG. 1. For example, the system 200 includes the second communication service provider 110, the first communication service provider 120, the first device 130, and the second device 140.

The system 200 includes a communication service provider server 216 that may be included within or coupled to the second communication service provider 110. The communication service provider server 216 may be a web real-time-communications server. The communication service provider server 216 may include at least one processor and at least one memory accessible to the at least one processor. The memory may include instructions that are executable by the processor to cause the processor to perform one or more methods described herein at communication service provider server 216.

The communication service provider server 216 may provide the first device 130 with one or more multimedia services provided by the second communication service provider 110. The communication service provider server 216 may facilitate communications between the first device 130 and the second device 140 via the session 150. For example, the communication service provider server 216 may facilitate web real-time-communications sessions between the first device 130 and the second device 140. The communication service provider server 216 may perform registration associated with particular multimedia services that are provided by the second communication service provider 110. The communication service provider server 216 may facilitate the creation of one or more connections such as a representative connection 260 with the second device 140. The communication service provider server 216 may create the connection 260 with the second device 140 in response to receiving a request to initiate the session 150 between the first device 130 and the second device 140.

The system 200 includes a communication service provider gateway 226. The communication service provider gateway 226 may be included within or coupled to the first communication service provider 120. The communication service provider gateway 226 may be a multimedia service gateway. The communication service provider gateway 226 may include at least one processor and at least one memory accessible to the at least one processor. The memory may include instructions that are executable by the processor to cause the processor to perform one or more methods described herein at communication service provider gateway 226. The communication service provider gateway 226 may be distinct from the communication service provider server 216.

The communication service provider gateway 226 may receive one or more requests (e.g., the request 236) from the second communication service provider 110, the communication service provider server 216, or both. In particular, the communication service provider gateway 226 may receive requests (e.g., the request 236) to initiate a session between the first device 130 and the second device 140. The communication service provider gateway 226 may send one or more call invitations (such as a representative call invitation 242) to the second device 140 in response to receiving the request 236. The call invitation 242 may include at least a portion of the information that is included in the call invitation 142. The communication service provider gateway 226 may perform registration for the first communication service provider 120.

The communication service provider gateway 226 may be communicatively connected, via one or more second communication connections (such as a representative second communication connection 228), to one or more second devices (e.g., the second device 140). The communication service provider gateway 226 may be configured to communicate with the second device 140 via a session initiation protocol (SIP).

In a particular embodiment, the one or more second devices may be communicatively connected to the communication service provider gateway 226 via a network 272. The network 272 may include one or more networks that facilitate communication between the communication service provider gateway 226 and the second device 140. The network 272 may be associated with one or more application service providers that facilitate communication for a particular application service (e.g., a multimedia service). Alternately, or in addition, the network 272 may be associated with a network access service provider, such as a mobile communication network provider, an internet or intranet access service provider, or a combination thereof.

The second communication service provider 110 and the first communication service provider 120 may be communicatively connected via a communication connection 218. For example, the second communication service provider 110 may be communicatively connected to the first communication service provider 120 via the communication service provider server 216. The first communication service provider 120 may be communicatively connected to the second communication service provider 110 via the communication service provider gateway 226.

The communication connection 218, the second communication connection 228, and the connection 260 may each include a wired connection, a wireless connection, other data connection, or a combination thereof. The communication connection 218, the second communication connection 228, the connection 260, or a combination thereof, may each facilitate communication according to wireless mobile communication compliant standards including CDMA, TDMA, FDMA, OFDMA, SC-FDMA, GSM, EDGE, evolved EDGE, UMTS, Wi-Max, GPRS, 3GPP, 3GPP2, 4G, LTE, 4G-LTE, HSPA, HSPA+, IEEE 802.11x, or a combination thereof.

In operation, the communication service provider server 216 may receive the request 132 to initiate the session 150 (e.g., a web real-time-communications session) with the second device 140 for a particular multimedia service. The communication service provider server 216 may process the request 132. For example, the communication service provider server 216 may determine whether the first device 130 or a user associated with the first device 130 is registered with the second communication service provider 110. The second device 140 may not be communicatively connected to the communication service provider server 216 prior to initiation of the session 150. In another example, the communication service provider server 216 may determine whether the first device 130 is configured to access or associated with the particular multimedia service. To illustrate, the communication service provider server 216 may determine that the first device 130 is configured to access or be associated with access to the particular multimedia service. The communication service provider server 216 may determine whether the first device 130 is configured to access or associated with the particular multimedia service by detecting a presence of an application in the first device 130 (e.g., a web real-time-communications browser). The communication service provider server 216 may be a web real-time communications server that facilitates web real-time-communication sessions between two or more devices. A web real-time-communications session between two devices may be enabled when the two devices have access to a particular application, such as a web real-time-communications browser that supports the web real-time-communications for the particular multimedia service.

The communication service provider server 216 may send the request 236 to the communication service provider gateway 226 to initiate the session 150 between the first device 130 and the second device 140 associated with a particular user. The request 236 may be based on or may correspond to the request 132. The request 236 may include at least a portion of the information that is included in the request 132. For example, the request 236 may be include the identification information included in the request 132. The request 236 may include information indicating that the session (e.g., the session 150) to be initiated is a web real-time-communications session. Such information may be used by the communication service provider gateway 226 to determine whether the second device 140 can initiate the session 150 with the first device 130 or to select the second device 140 from among multiple devices associated with the identification information. The communication service provider server 216 may provide a uniform resource locator (URL) address in the request 236. The URL may include a location where a connection, such as the connection 260, may be established at the communication service provider server 216.

The communication service provider server 216 may determine based on the identification information included in the request 132 that the request 236 is to be sent to a particular communication service provider gateway (e.g., the communication service provider gateway 226). For example, the communication service provider server 216 may determine based on contact information (e.g., an email address) included in the identification information that the request 236 is to be sent to a particular communication service provider (e.g., the first communication service provider 120). Based on determining the particular first communication service provider 120, the communication service provider server 216 may send the request 236 to a known internet protocol address of the communication service provider gateway 226 that receive requests (e.g., the request 236) for the first communication service provider 120.

The communication service provider gateway 226 may receive the request 236 sent from the communication service provider server 216. The communication service provider gateway 226 may send one or more call invitations (e.g., the call invitation 242) to one or more second devices (e.g., the second device 140) based on the request 236. For example, the call invitation 242 may be sent to the second device 140 to invite the second device 140 to initiate a session 150 with the first device 130.

The communication service provider gateway 226 may determine access information associated with one or more second devices (e.g., the second device 140) associated with the user based on the identification information included in the request 236. Using the access information, the communication service provider gateway 226 may determine whether one or more second devices (e.g., the second device 140) are registered with the first communication service provider 120 to receive a communication service. The access information may identify a plurality of devices such as the one or more second devices that include the second device 140. In a particular embodiment, the communication service provider gateway 226 may select one or more second devices including the second device 140 from the plurality of devices identified in the access information.

In a particular embodiment, the communication service provider gateway 226 may select the second device 140 based on determining that the second device 140 includes an application configured to access a particular multimedia service. For example, the communication service provider gateway 226 may determine that the session to be initiated based on the request 236 is a web real-time-communications session (e.g., based on information included in the request 236). As such, the communication service provider gateway 226 may determine whether the second device 140 includes a web real-time communications application. The access information associated with the second device 140 may include information indicating one or more applications supported by the second device 140. In one example, the communication service provider gateway 226 may select the second device 140 from the plurality of devices based on determining that the second device 140 includes a web real-time-communications browser that is configured to access a particular multimedia service.

In a particular embodiment, the communication service provider gateway 226 selects the second device 140 from the plurality of devices because the second device 140 is associated with a communication identifier (e.g., a telephone number) included in the identification information of the request 236. For example, the communication service provider gateway 226 may identify the second device 140 in the access information as being associated with the telephone number for a particular communication service provided to the second device 140.

The communication service provider gateway 226 may send the call invitation 242 to the one or more second devices (e.g., the second device 140) via the second communication connection 228 to initiate the session 150 with the first device 130. The call invitation 242 may identify a calling party associated with the first device 130, a multimedia service associated with the request 236, a topic of the session to be initiated for the request 132, a user of the second device 140, or a combination thereof. The call invitation 242 may include a location at the communication service provider server 216 where a connection (e.g., the connection 260) may be established. The location may correspond to the URL included in the request 236 received by the first communication service provider 120.

By accepting the call invitation 242, the connection 260 may be created between the second device 140 and the communication service provider server 216. Accepting the call invitation 242 may cause the second device 140 receive a particular application 166 from the communication service provider server 216 via the connection 260. The second device 140 may create the connection 260 with the communication service provider server 216 based on the location (in the URL included in the call invitation 242) at the communication service provider server 216. The session 150 (e.g., a web real time-communications session) may be initiated between the second device 140 and the first device 130 based on the connection 260 to the communication service provider server 216. The session 150 may be initiated from the particular application 166 at the second device 140 via the connection 260. The particular application 166 may provide the multimedia service. Alternatively, the particular application 166 may be executable to facilitate initiation of the session 150 with the first device 130. The session 150 may be initiated by the first device 130 via the particular application 166, by the second device 140 via the particular application 166, or both. The session 150 may be initiated from the particular application 166 at the second device via the connection 260 created with the communication service provider server 216. The first device 130 may communicate with the second device 140 in response to initiation of the session 150 for the multimedia service.

The communication service provider gateway 226 may receive one or more communications, via the second communication connection 228, from the second device 140 indicating a status associated with the call invitation 242. In a particular embodiment, the communication service provider gateway 226 may receive a notification that the second device 140 has accepted the call invitation 142. Based on whether the notification regarding the call invitation 242 is received, the communication service provider gateway 226 may determine whether to send additional call invitations to invite the second device 140 to initiate additional sessions (e.g., between the second device 140 and another device (not shown)). The first device 130 may initiate the session 150 with the second device 140 in response to receiving the notification.

Figure 3:
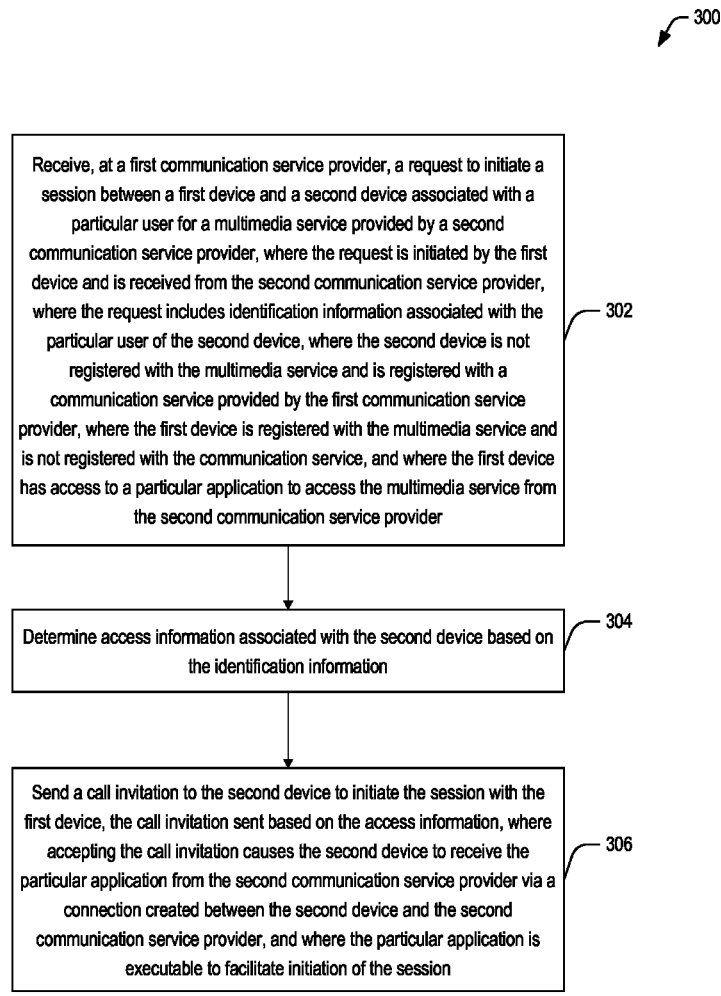
FIG. 3 is a flow chart of a first embodiment of a method to initiate a session between two devices for an multimedia service.

Referring to FIG. 3, a flow chart of a first embodiment of a method 300 to initiate a session between two devices for a multimedia service is depicted. The method 300 may be performed by the system 100 of FIG. 1 or the system 200 of FIG. 2.

At 302, the method 300 includes receiving, at a first communication service provider, a request to initiate a session between a first device and a second device associated with a particular user for a multimedia service provided by a second communication service provider. The request may be initiated by the first device and may be received from the second communication service provider. The request may include identification information associated with the particular user of the second device. For example, the first communication service provider 120 of FIG. 1 may receive the request 132 to initiate the session 150 between the first device 130 and the second device 140 associated with the particular user for a multimedia service (e.g., a voice-over-internet protocol service) provided by the second communication service provider 110 (e.g., a voice-over-internet protocol service provider). The request 132 may be initiated by the first device 130 and may be received from the second communication service provider 110. The request 132 may include identification information associated with the particular user of the second device 140.

The second device may not be registered with the multimedia service provided by the second communication service provider and may be registered with a communication service provided by the first communication service provider. The first device may be registered with the multimedia service and may not be registered with the communication service. The first device may have access to a particular application to access the multimedia service from the second communication service provider. For example, the second device 140 is registered with the multimedia service provided by the second communication service provider 110 and is registered with a communication service (e.g., a telephony service) provided by the first communication service provider 120. The first device 130 is registered with the multimedia service and is registered with the communication service.

At 304, the method 300 includes determining access information associated with the second device based on the identification information. For example, the first communication service provider 120 of FIG. 1 may determine access information associated with the second device 140 based on the identification information (e.g., a communication identifier, such as a telephone number). In a particular embodiment, the access information may include an internet address of the second device. To determine the access information, the first communication service provider 120 searches contents of the memory 124 to locate registration information of the second device 140 that is associated with the telephone number. The registration information may include the access information, such as the internet address, of the second device.

At 306, the method 300 includes sending a call invitation to the second device to initiate the session with the first device. The call invitation may be sent based on the access information. For example, the first communication service provider 120 of FIG. 1 may send the call invitation 142 to the second device 140 to initiate the session 150 with the first device 130. The first communication service provider 120 may send the call invitation 142 based on the access information. Accepting the call invitation may cause the second device to receive the particular application from the second communication service provider via a connection created between the second device and the second communication service provider. The particular application is executable to facilitate initiation of the session. For example, in response to the second device 140 accepting the call invitation 142, the second device 140 may receive a particular application 166 from the second communication service provider 110 via a connection 160 created between the second device 140 and the second communication service provider 110. The particular application 166 may be executable at the second device 140 to facilitate initiation of the session 150.

Thus, the method 300 illustrates how one device (e.g., the first device 130 of FIG. 1) may invite other devices (e.g., the second device 140), which are not registered with a multimedia service, to join a session for a multimedia service provided by a communication service provider. Further, the method illustrates how a communication service provider may enable a device that is not registered with the communication service provider to initiate a session with another device that is registered with a communication service provider providing a distinct multimedia service without being registered to receive the multimedia service.

Figure 4:
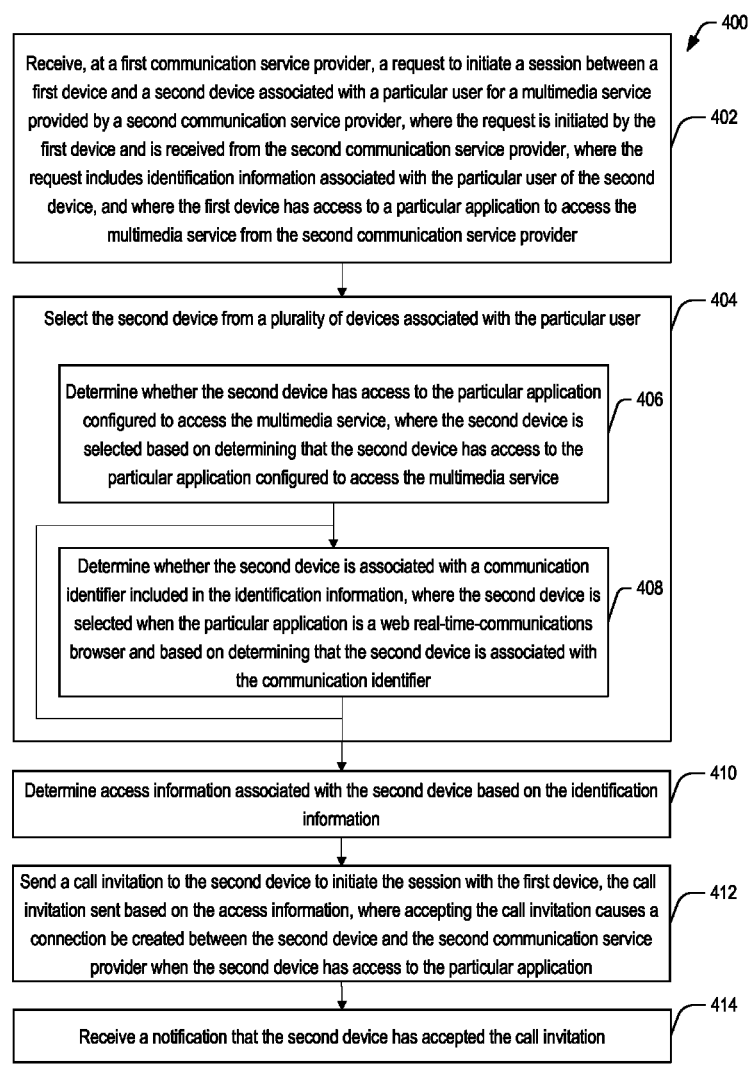
FIG. 4 is a flow chart of a second embodiment of a method to initiate a session between two devices for an multimedia service.

Referring to FIG. 4, a flow chart of a second embodiment of a method 400 to initiate a session between two devices for a multimedia service is depicted. The method 400 may be performed by the system 100 of FIG. 1 or the system 200 of FIG. 2.

At 402, the method 400 includes receiving, at a first communication service provider, a request to initiate a session between a first device and a second device associated with a particular user for a multimedia service provided by a second communication service provider. The request may be initiated by the first device and may be received from the second communication service provider. The request may include identification information associated with the particular user of the second device. The first device may have access to a particular application to access the multimedia service from the second communication service provider. For example, the second communication service provider 110 of FIG. 1 may receive the request 132 to initiate the session 150 between the first device 130 and the second device 140 associated with a particular user for a multimedia service (e.g., a voice-over-internet protocol service) provided by the second communication service provider 110 (e.g., a voice-over-internet protocol service provider). The request 132 may be initiated by the first device 130 and may be received from the second communication service provider 110. The request 132 may include identification information (e.g., an email address) associated with the particular user of the second device 140.

At 404, the method 400 includes selecting the second device from a plurality of devices associated with the particular user. For example, the first communication service provider 120 of FIG. 1 may select the second device 140 from a plurality of devices associated with the particular user based on the identification included within the request 132.

At 406, selecting the second device may include determining whether the second device has access to the particular application configured to access the multimedia service. The second device may be selected from the plurality of devices based on determining that the second device has access to the particular application configured to access the multimedia service. For example, the first communication service provider 120 of FIG. 1 may determine whether the second device 140 has access to a particular application configured to access the multimedia service (e.g., a voice-over-internet protocol service). The first communication service provider 120 may select the second device 140 based on determining that the second device 140 has access to the particular application configured to access the multimedia service.

At 408, selecting the second device may include determining whether the second device is associated with a communication identifier included in the identification information. The second device may be selected based on determining that the second device is associated with the communication identifier. For example, the first communication service provider 120 of FIG. 1 may determine whether the second device 140 is associated with a communication identifier included in the identification information. The first communication service provider 120 may select the second device 140 based on determining that the second device is associated with the communication identifier and that the second device 140 includes a web real-time-communications browser application.

At 410, the method 400 includes determining access information associated with the second device based on the identification information. For example, the first communication service provider 120 of FIG. 1 may determine access information associated with the second device 140 based on the identification information.

At 412, the method 400 includes sending a call invitation to the second device to initiate the session with the first device. The call invitation may be sent based on the access information. Accepting the call invitation may cause a connection be created between the second device and the second communication service provider when the second device has access to the particular application. For example, the first communication service provider 120 of FIG. 1 may send the call invitation 142 to the second device 140 to initiate the session 150 with the first device 130, and the second device 140, when the second device 140 has access to the particular application.

At 414, the method 400 includes receiving a notification that the second device has accepted the call invitation. For example, the first communication service provider 120 of FIG. 1 may receive a notification that the second device 140 has accepted the call invitation 142.

Thus, one or more of the embodiments disclosed herein enable two devices to communicate via a session that is initiated through communication between two service providers, each of which provides a distinct communication service to a distinct one of the two devices. The session initiated between the two devices may facilitate communications between the two devices for a multimedia service, which may not otherwise be possible due to limitations of the devices themselves or services available to each of the two devices. The communication facilitated by the communication service providers may enable the session to be initiated synchronously via a call invitation through one of the two devices. The call invitation may enable a device to join the session with another device without registering with a communication service provider that provides the multimedia service corresponding to the session. In embodiments that support web real-time-communications in which the two devices include a web real-time-communications browser application, a session can be initiated for many types of multimedia services that are supported by the web real-time-communications browser application.

Figure 5:
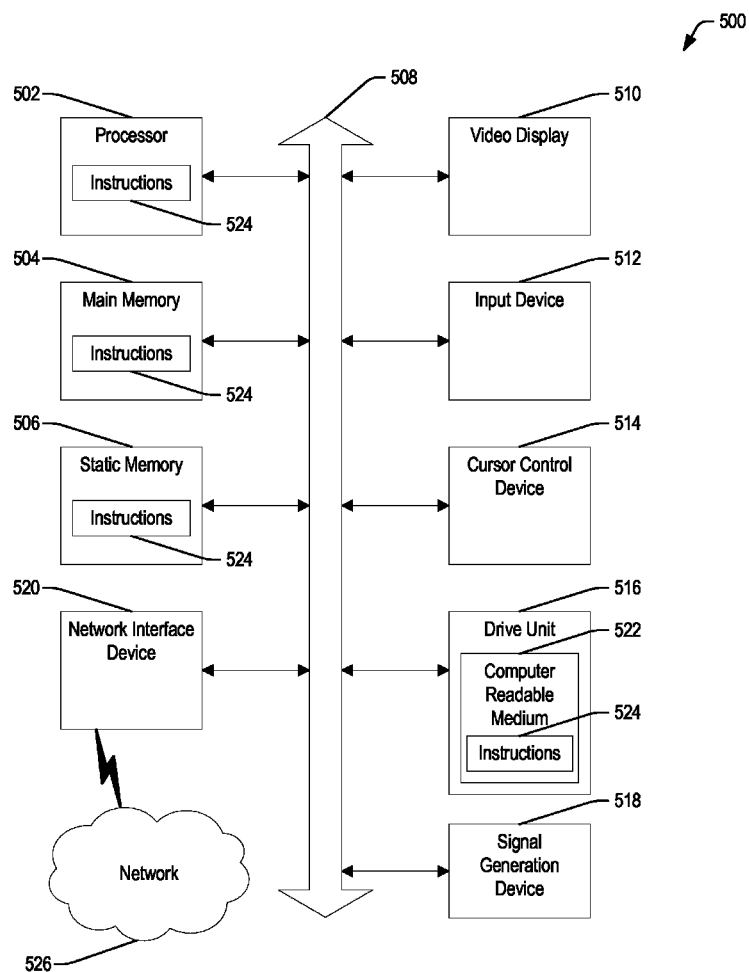
FIG. 5 is an illustration of an illustrative embodiment of a general computer system.

Referring to FIG. 5, an illustrative embodiment of a general computer system is shown and is designated 500. The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include, be included within, or correspond to one or more of the components of the second communication service provider 110, the first communication service provider 120, the first device 130, the second device 140, or a combination thereof described with reference to FIG. 1. In another example, the computer system 500 may include, be included within, or correspond to one or more of the components of the second communication service provider 110, the communication service provider server 216, the first communication service provider 120, the communication service provider gateway 226, the first device 130, the second device 140, or a combination thereof described with reference to FIG. 2.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a STB, a PDA, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be the processor 112 of FIG. 1, the processor 122 of FIG. 1, the processor 212 of FIG. 2, the processor 222 of FIG. 2, or a combination thereof. Moreover, the computer system 500 may include a main memory 504 and a static memory 506, which can communicate with each other via a bus 508. For example, the main memory 504 may be the memory 114 of FIG. 1, the memory 124 of FIG. 1, the memory 214 of FIG. 2, the memory 224 of FIG. 2, or a combination thereof. As shown, the computer system 500 may further include a video display unit 510, such as a liquid crystal display (LCD), a flat panel display, a solid state display, or a lamp assembly of a projection system. Additionally, the computer system 500 may include an input device 512, such as a keyboard, and a cursor control device 514, such as a mouse. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a computer-readable non-transitory storage medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable non-transitory storage medium 522 that stores instructions 524 or receives, stores and executes instructions 524, so that a device connected to a network 526 may communicate voice, video or data over the network 526. For example, the device may include or be included within one or more of the components of the first communication service provider 120, the second communication service provider 110, the first device 130, the second device 140, or a combination thereof described with reference to FIG. 1. In another example, the device may include or be included within one or more of the components of the first communication service provider 120, the communication service provider server 216, the second communication service provider 110, the communication service provider gateway 226, the first device 130, the second device 140, or a combination thereof described with reference to FIG. 2. While the tangible computer-readable storage medium is shown to be a single medium, the term "tangible computer-readable medium" includes a single medium or multiple media, such as a centralized or distributed database, and/or associated caches and servers that store one or more sets of instructions. The term "tangible computer-readable medium" shall also include any non-transitory medium that is capable of storing a set of instructions for execution by a processor or that cause a computer system to perform any one or more of the methods or operations disclosed herein.

In a particular non-limiting, exemplary embodiment, the tangible computer-readable storage medium may include a solid-state memory such as a memory card or other package that houses one or more non-volatile read-only memories. Further, the tangible computer-readable storage medium may be a random access memory or other volatile re-writable memory. Additionally, the tangible computer-readable storage medium may include a magneto-optical or optical medium, such as a disk or tapes or other storage device. Accordingly, the disclosure is considered to include any one or more of a tangible computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards and protocols for communication include RTP, TCP/IP, UDP/IP, CDMA, TDMA, FDMA, OFDMA, SC-FDMA, GSM, EDGE, evolved EDGE, UMTS, Wi-Max, GPRS, 3GPP, 3GPP2, 4G, LTE, 4G-LTE, HSPA, HSPA+, and Institute of Electrical and Electronics Engineers (IEEE) 802.11x. Such standards and protocols are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at a first communication service provider, a request to initiate a session between a first device and a second device that is associated with a particular user for a multimedia service provided by a second communication service provider, wherein the request is initiated by the first device and is received from the second communication service provider, wherein the request includes identification information associated with the particular user, wherein the second device is not registered with the multimedia service and is registered with a communication service provided by the first communication service provider, wherein the first device is registered with the multimedia service and is not registered with the communication service, and wherein the first device has access to a particular application to access the multimedia service from the second communication service provider;
determining, by the first communication service provider, access information associated with the second device based on the identification information received from the second communication service provider; and
sending, by the first communication service provider, a call invitation to the second device to initiate the session with the first device, the call invitation sent based on the access information, wherein the call invitation is sent as a telephone call, wherein accepting the call invitation causes the second device to receive the particular application from the second communication service provider via a connection created between the second device and the second communication service provider, and wherein the particular application is executable to facilitate initiation of the session.

2. The method of claim 1, wherein the communication service provided by the first communication service provider includes telephony services, and wherein the identification information includes a communication identifier associated with the communication service.

3. The method of claim 1, wherein the session is facilitated via a network communicatively connected to the first service provider, the second service provider, or both.

4. The method of claim 1, wherein the call invitation identifies a calling party associated with the first device and identifies a category of the multimedia service.

5. The method of claim 1, wherein the session is automatically initiated after receipt of the particular application at the second device.

6. The method of claim 1, further comprising:
receiving a notification that the second device has accepted the call invitation; and
sending the notification to the second communication service provider to communicate the notification to the first device.

7. The method of claim 1, wherein the request is sent by the particular application at the first device, and wherein the particular application is configured to access the multimedia service.

8. The method of claim 1, wherein the call invitation is a session initiation protocol invite request.

9. The method of claim 1, wherein the request includes a uniform resource locator address that includes a location at the second communication service provider that identifies where the connection is to be created.

10. The method of claim 1, wherein the particular application comprises a web browser configured to provide communications between the first device and the second device.

11. The method of claim 1, further comprising selecting, by the first communication service provider, the second device from a plurality of devices associated with the particular user based on the identification information.

12. The method of claim 1, further comprising determining, prior to sending the call invitation, whether the second device has the particular application used to access the multimedia service, wherein the second device is selected based on determining that the second device has the particular application used to access the multimedia service, and wherein accepting the call invitation causes the connection to be created between the second device and the second communication service provider when the second device has the particular application.

13. The method of claim 12, further comprising determining whether the second device is associated with a communication identifier included in the identification information, wherein the second device is selected when the particular application is a web real-time-communications browser and based on determining that the second device is associated with the communication identifier included in the identification information.

14. The method of claim 1, wherein the access information indicates communication preferences associated with the second device.

15. A system comprising:
a processor of a first communication service provider; and
memory accessible to the processor, the memory including instructions that, when executed by the processor, cause the processor to perform operations comprising:
receiving a request to initiate a session between a first device and a second device that is associated with a particular user for a multimedia service provided by a second communication service provider, wherein the request is initiated by the first device and is received from the second communication service provider, wherein the request includes identification information associated with the particular user, wherein the second device is not registered with the multimedia service and is registered with a communication service provided by the first communication service provider, wherein the first device is registered with the multimedia service and is not registered with the communication service, and wherein the first device has access to a particular application to access the multimedia service from the second communication service provider;
determining access information associated with the second device based on the identification information received from the second communication service provider; and
sending a call invitation to the second device to initiate the session with the first device, the call invitation sent based on the access information, wherein the call invitation is sent as a telephone call, wherein accepting the call invitation causes the second device to receive the particular application from the second communication service provider via a connection created between the second device and the second communication service provider, and wherein the particular application is executable to facilitate initiation of the session.

16. The system of claim 15, wherein the request is received from a service provider server associated with the second communication service provider, wherein the connection is between the second device and the service provider server, and wherein the second device receives the particular application from the service provider server.

17. The system of claim 16, wherein the particular application comprises a web browser that is configured to access a plurality of multimedia services that include the multimedia service and to access, via the connection, the service provider server in response to the second device accepting the call invitation.

18. The system of claim 15, wherein the request is received at a service provider gateway associated with the first communication service provider and wherein the call invitation is sent from the service provider gateway.

19. A computer-readable storage device including instructions that, when executed by a processor of a first communication service provider, cause the processor to perform operations comprising:

receiving a request to initiate a session between a first device and a second device that is associated with a particular user for a multimedia service provided by a second communication service provider, wherein the request is initiated by the first device and is received from the second communication service provider, wherein the request includes identification information associated with the particular user, wherein the second device is not registered with the multimedia service and is registered with a communication service provided by the first communication service provider, wherein the first device is registered with the multimedia service and is not registered with the communication service, and wherein the first device has access to a particular application to access the multimedia service from the second communication service provider;

determining access information associated with the second device based on the identification information received from the second communication service provider; and sending a call invitation to the second device to initiate the session with the first device, the call invitation sent based on the access information, wherein the call invitation is sent as a telephone call, wherein accepting the call invitation causes the second device to receive the particular application from the second communication service provider via a connection created between the second device and the second communication service provider, and wherein the particular application is executable to facilitate initiation of the session.

20. The computer-readable storage device of claim 19, wherein the session enables a user-to-user communication between the first device and the second device via a direct connection that is distinct from the connection between the second device and the second communication service provider.

* * * * *